(12) United States Patent
Gingerich et al.

(10) Patent No.: US 11,857,900 B2
(45) Date of Patent: Jan. 2, 2024

(54) GAS FILTRATION APPARATUS

(71) Applicant: Porvair Filtration Group Limited, Fareham (GB)

(72) Inventors: Nathan D. Gingerich, Boise, ID (US); Paul Nunes, Meridan, ID (US); Jerry A. Young, Nampa, ID (US)

(73) Assignee: Porvair Filtration Group Limited, Fareham (GB)

( * ) Notice: Subject to any disclaimer, the term of this patent is extended or adjusted under 35 U.S.C. 154(b) by 603 days.

(21) Appl. No.: 17/109,906

(22) Filed: Dec. 2, 2020

(65) Prior Publication Data
US 2021/0162326 A1 Jun. 3, 2021

Related U.S. Application Data (60) Provisional application No. 62/942,342, filed on Dec. 2, 2019.

(51) Int. Cl.
*B01D 35/30* (2006.01)
*B01D 39/20* (2006.01)
*B01D 29/01* (2006.01)

(52) U.S. Cl.
CPC ............. *B01D 35/30* (2013.01); *B01D 29/01* (2013.01); *B01D 39/2041* (2013.01); *B01D 2201/302* (2013.01); *B01D 2201/305* (2013.01)

(58) Field of Classification Search
CPC .... B01D 35/30; B01D 29/01; B01D 39/2041; B01D 2201/302; B01D 2201/305;
(Continued)

(56) References Cited

U.S. PATENT DOCUMENTS 5,615,999 A * 4/1997 Sukup .................. F04D 29/545
  415/220
6,174,340 B1 * 1/2001 Hodge .................. B01D 46/10
  55/482
(Continued)

FOREIGN PATENT DOCUMENTS

CN 105771463 A 7/2016
CN 208704052 U 4/2019
(Continued)

OTHER PUBLICATIONS

International Searching Authority, PCT International Search Report and Written Opinion, International Application No. PCT/IB2020/001018, dated Feb. 26, 2021, pp. 1-13.

*Primary Examiner* — Stephen Hobson
(74) *Attorney, Agent, or Firm* — Hunton Andrews Kurth LLP (57) ABSTRACT

A filtration element assembly for use with a cylindrical filter casing has a prismatic support body with a support body interior space. The side walls of the support body form a polygonal outer cross-sectional shape defining a circumscribed circle with a diameter less than or equal to the casing diameter. At least one side wall has an inlet flow passage with a receiving channel surrounding it. A porous filtration structure is disposed within the receiving channel so as to cover the inlet flow passage. A clamping member attached to each of the at least one side wall has a framing portion and a flange portion. The framing portion has a flow window formed there-through in registration with the inlet flow passage. The flange portion extends from the framing portion and is sized and configured for reception into the receiving channel to engage and retain the filtration element within the channel.

20 Claims, 9 Drawing Sheets

(58) Field of Classification Search
CPC .............. B01D 46/58; B01D 2265/028; B01D 2265/06; B01D 2275/205; B01D 2279/51; B01D 46/0002; B01D 46/0012; B01D 46/24; B01D 46/12
See application file for complete search history.

(56) References Cited

U.S. PATENT DOCUMENTS

| | | | | |
|---|---|---|---|---|
| 6,436,299 | B1* | 8/2002 | Baarman | A61L 2/10 |
| | | | | 361/674 |
| 6,673,250 | B2* | 1/2004 | Kuennen | C02F 9/20 |
| | | | | 210/260 |
| 7,074,250 | B1* | 7/2006 | Chipner | B01D 46/0005 |
| | | | | 95/286 |
| 7,679,879 | B2* | 3/2010 | Furuhashi | F24F 11/88 |
| | | | | 361/231 |
| 7,806,952 | B2* | 10/2010 | Fox | A61L 9/22 |
| | | | | 313/313 |
| 7,938,896 | B2* | 5/2011 | Paterson | B03C 3/32 |
| | | | | 96/417 |
| 8,414,670 | B2* | 4/2013 | Lee | F24F 8/80 |
| | | | | 55/467 |
| 8,974,565 | B2* | 3/2015 | Cecchi | B01D 46/44 |
| | | | | 55/482 |
| 9,492,768 | B2* | 11/2016 | Fick | B01D 35/147 |
| 9,694,369 | B2* | 7/2017 | Engberg | B03C 3/86 |
| 9,700,823 | B2* | 7/2017 | Stoner, Jr. | B01D 46/0086 |
| 9,895,462 | B2* | 2/2018 | Law | F24F 13/28 |
| 9,919,252 | B2* | 3/2018 | Wennerström | F24F 8/108 |
| 10,335,725 | B2* | 7/2019 | Woods | B01D 46/2411 |
| 10,512,873 | B2* | 12/2019 | Stoner, Jr. | B01D 46/62 |
| 10,583,384 | B2* | 3/2020 | Chu | B01D 46/50 |
| 10,821,389 | B2* | 11/2020 | Bae | B01D 46/12 |
| 10,920,792 | B2* | 2/2021 | Xiao | B01D 46/0047 |
| 11,319,958 | B2* | 5/2022 | Schaller | B01D 46/0047 |
| 11,471,806 | B2* | 10/2022 | Jeon | B01D 46/442 |
| 2001/0013274 | A1* | 8/2001 | Oda | B01D 46/0036 |
| | | | | 96/134 |
| 2004/0118288 | A1* | 6/2004 | Kim | F24F 11/62 |
| | | | | 96/417 |
| 2006/0053758 | A1* | 3/2006 | Wu | B01D 50/20 |
| | | | | 55/471 |
| 2006/0107834 | A1* | 5/2006 | Vandenbelt | B03C 3/025 |
| | | | | 96/75 |
| 2006/0162300 | A1* | 7/2006 | Sharifi | B01D 46/0006 |
| | | | | 55/350.1 |
| 2006/0201119 | A1* | 9/2006 | Song | B01D 53/007 |
| | | | | 55/471 |
| 2006/0277875 | A1* | 12/2006 | Schuld | B01D 46/521 |
| | | | | 55/484 |
| 2006/0278074 | A1* | 12/2006 | Tseng | B03C 3/32 |
| | | | | 95/57 |
| 2007/0277487 | A1* | 12/2007 | Thurin | B01D 46/0035 |
| | | | | 55/471 |
| 2008/0028733 | A1* | 2/2008 | Paterson | B01D 46/0002 |
| | | | | 55/471 |
| 2011/0100221 | A1* | 5/2011 | Wu | B01D 46/12 |
| | | | | 96/64 |
| 2013/0305930 | A1* | 11/2013 | Oh | F02M 35/02425 |
| | | | | 96/385 |
| 2015/0343110 | A1* | 12/2015 | Williams | A61L 9/20 |
| | | | | 422/121 |
| 2015/0354578 | A1* | 12/2015 | Avedon | F04D 29/544 |
| | | | | 415/222 |
| 2016/0030870 | A1* | 2/2016 | Schmelzle | B01D 46/0031 |
| | | | | 285/119 |
| 2016/0186703 | A1* | 6/2016 | Tanahashi | F02M 35/0205 |
| | | | | 123/184.21 |
| 2018/0250625 | A1* | 9/2018 | Pflueger | B01D 46/10 |
| 2018/0264384 | A1* | 9/2018 | Roth | B01D 39/14 |
| 2023/0258167 | A1* | 8/2023 | Middlebrook | B01D 35/02 |
| | | | | 417/313 |

FOREIGN PATENT DOCUMENTS

| | | |
|---|---|---|
| CN | 210057648 U | 2/2020 |
| EP | 2977091 A1 | 1/2016 |
| WO | 2015135488 A1 | 9/2015 |
| WO | 2016071201 A1 | 5/2016 |
| WO | 2017207203 A1 | 12/2017 |

* cited by examiner

GAS FILTRATION APPARATUS

This application claims priority to U.S. Provisional No. 62/942,342, filed Dec. 2, 2019, the complete disclosure of which is incorporated herein by reference.

BACKGROUND OF THE INVENTION

This application relates generally to an improvement in gas filtration products and methodologies. More specifically, it relates to a customizable, modular assembly of parts used to secure a large surface area of a media substrate into a limited space without limitations on the size or configuration of the media "capsule".

Gas filtration is extremely important in microelectronic industries, medical industries, and other numerous industries. Gas filters come in a few different arrangements, mainly surface mount filters, in-line filters, and point-of-use filters. Surface mounted filtration devices are often used in applications where floor space is restricted. An arrangement of valves, flow controllers, and other elements can be implemented as needed using a surface mount fitting.

Figure 1:
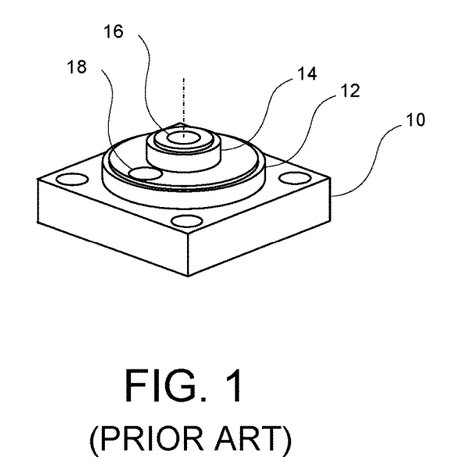
FIG. 1 is a perspective view of a prior art filtration apparatus surface mount.
Figure 2A:
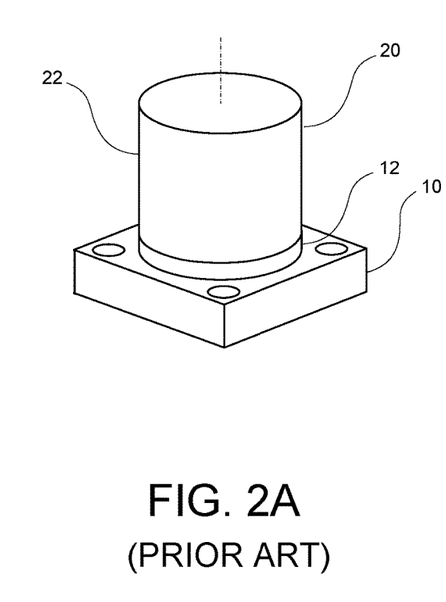
FIG. 2A is a perspective view of a prior art filtration apparatus mounted to the surface mount of FIG. 1.
Figure 2B:
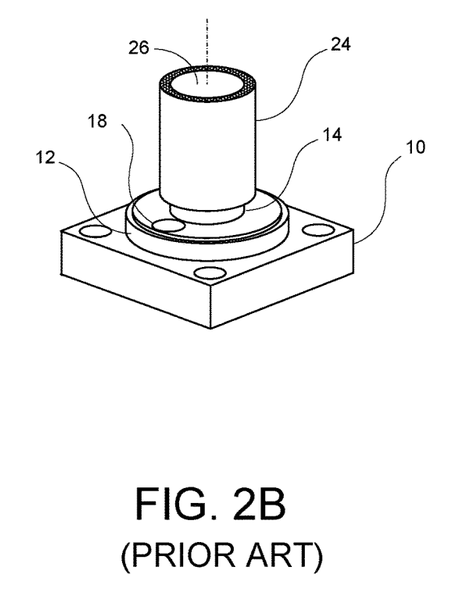
FIG. 2B is a perspective view of the apparatus of FIG. 2A with its cylindrical cover removed.
Figure 3:
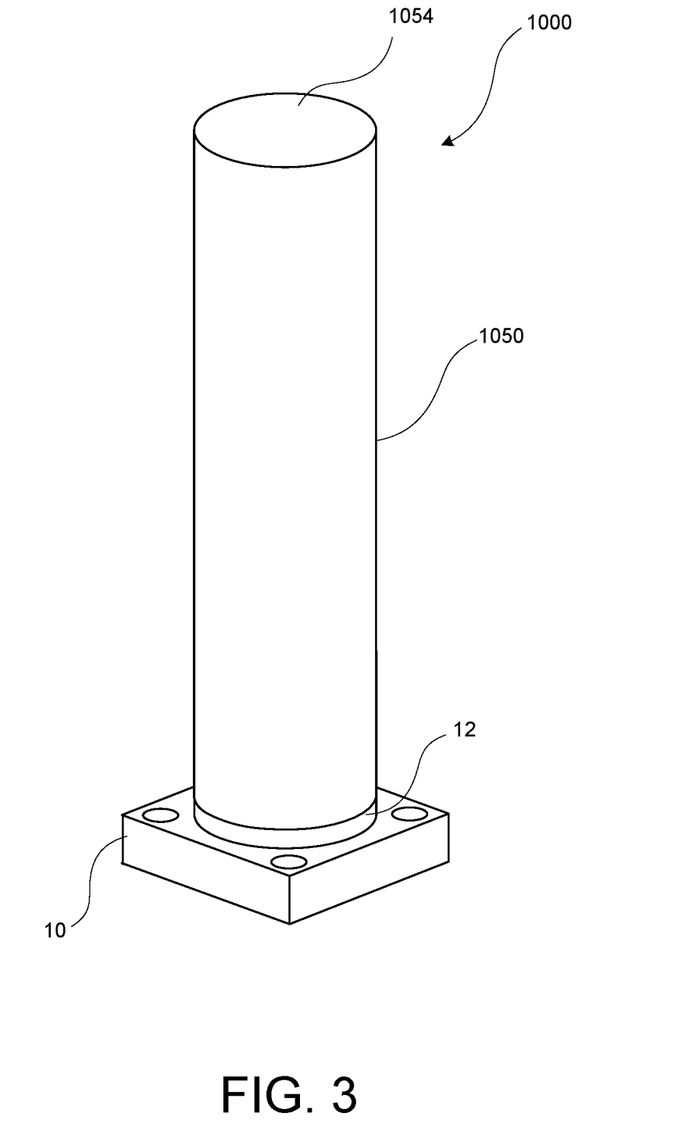
FIG. 3 is a perspective view of a filtration apparatus according to an embodiment of the invention mounted to the surface mount of FIG. 1.
Figure 4:
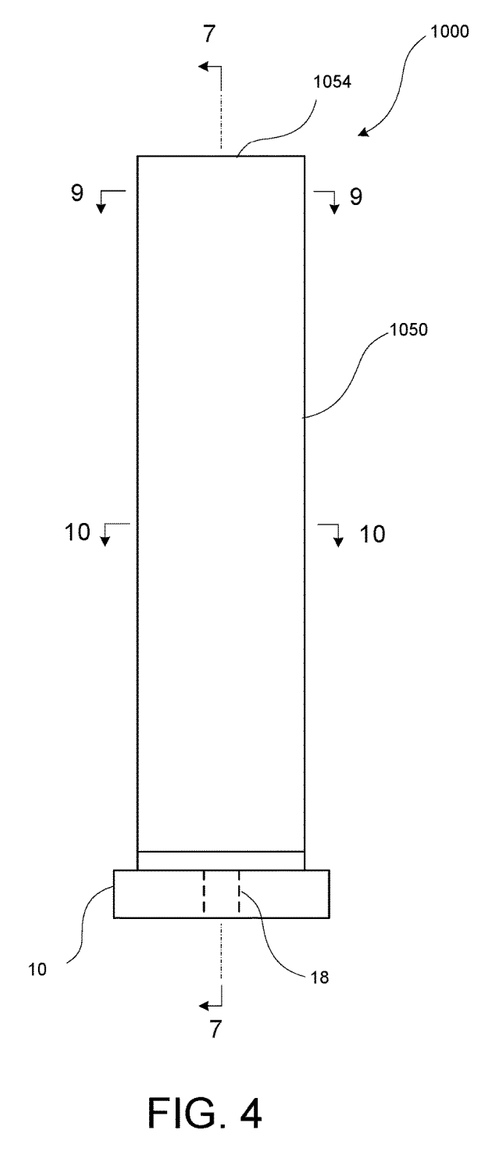
FIG. 4 is a front view of the filtration apparatus of FIG. 3.

FIG. 1 illustrates a simple, exemplary surface mount fixture 10 that is intended for use with a filtration device having filter media positioned within a surrounding housing. The mount 10 provides a gas inlet port 18 and a center-line aligned port 16. The port 16 is typically an outlet port, but in some cases could be used as an inlet port. As shown in FIGS. 2A and 2B, a filtration device 20 with a cylindrical casing 22 may be secured to the mount's attachment fixture 14 so that the cylindrical base 12 of the mount 10 acts to close off the bottom of the device's casing 22. Typically, the filtration device 20 has an annular cylindrical filter medium 24 with a central passage 26 that may be closed off at its upper end by the top of the casing 22 and that is aligned with the exit port 16. The filter medium 24 is sized and positioned so that when the device 20 is installed on the surface mount 10, gas entering through the a second port 18 flows into the interior of the casing 22 surrounding the filter media 24. By establishing a pressure differential between the inlet port 14 and the first port 16, particle laden gas is drawn radially through the filter medium 24 into the central passage 26. The filter medium 24 is configured to prevent passage of particles exceeding a predetermined size, thereby removing them from the gas flow.

The standard for surface mounts and other vertically configured filters is to have the filtration media be of a sintered porous metal design. Companies often develop this technology in-house. The development task is cumbersome and entails numerous months or years of development cycling. The resulting media tend to be expensive and may have a relatively short life-span.

SUMMARY OF THE INVENTION

An illustrative aspect of the invention provides a filtration element assembly for use in conjunction with a cylindrical filter casing having a casing diameter. The filtration element assembly comprises a prismatic support body having top and bottom base walls and a plurality of rectangular side walls connecting the top and bottom base walls. The top, bottom and side walls define a support body interior space. The side walls collectively form a polygonal outer cross-sectional shape defining a circumscribed circle having a circumscribed circle diameter less than or equal to the casing diameter. The base wall has an outlet flow passage formed there-through. At least one of the side walls has an inlet flow passage formed-there-through with a filtration element receiving channel surrounding the inlet flow passage. The filtration element assembly further comprises a porous filtration structure disposed within the filtration element receiving channel of each of the at least one of the side walls so as to cover the inlet flow passage. The filtration structure is configured for removing particulate matter from a gas flow passing there-through. The filtration element assembly also comprises; a clamping member attached to each of the at least one side wall. Each clamping member has a framing portion and a flange portion. The framing portion extends along a full length and a full width of said at least one side wall and has a flow window formed there-through in registration with the inlet flow passage. The flange portion extends from the framing portion and is sized and configured for reception into the receiving channel to engage and retain the filtration element within the receiving channel.

Another illustrative aspect of the invention provides a filtration apparatus comprising a cylindrical casing, having a longitudinal casing centerline, a cylindrical wall having an inside diameter, and first and second end caps. The cylindrical wall and first and second end caps define a casing interior space. The casing has a first flow port formed through the first cap along the casing centerline and a second flow port formed through one of the first and second end caps. The filtration apparatus further comprises a prismatic support body disposed within the cylindrical casing along the longitudinal casing centerline. The support body has top and bottom base walls and a plurality of side walls connecting the top and bottom base walls. The top, bottom and side walls define a support body interior space and the base wall has an outlet flow passage formed there-through. At least one of the side walls has an inlet flow passage formed-there-through and a filtration element receiving channel surrounding the inlet flow passage. The support body is secured to the first end cap so that the outlet flow passage is in registration and fluid communication with the first flow passage. The filtration apparatus still further comprises a porous filtration structure disposed within the filtration element receiving channel of each of the at least one of the side walls so as to cover the inlet flow passage. The filtration structure is configured for removing particulate matter from a gas flow passing there-through. The filtration apparatus also comprises a clamping member attached to each of the at least one side wall. Each clamping member has a framing portion and a flange portion. The framing portion extends along a full length and a full width of said at least one side wall and has a flow window formed there-through in registration with the inlet flow passage. The flange portion extends from the framing portion and is sized and configured for reception into the receiving channel to engage and retain the filtration element within the receiving channel.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments, it will be understood that the invention is not limited to these embodiments. On the contrary, it is contemplated that various alternatives, modifications and equivalents are included within the spirit and scope of the invention as described. In the description of the invention, the majority of references are to an example used as a surface mount. If otherwise, it will be stated.

While surface mounted filters have significant advantages, they are often restricted to a small surface footprint. Accordingly, their main scalable feature is height. Although it is possible to increase the filtration area of sintered porous metal media by extending the height of the cylindrical filter element, the cost may be prohibitive. Embodiments of the present invention provide planar filter media elements and media retention mechanisms that may be less costly and allow the use of media materials that may not be usable in cylindrical media configurations. The height of such media elements is virtually unlimited, and filtration performance can meet or exceed that of comparable sintered metal media.

Filtration devices of the invention may use a cylindrical casing similar to (but typically longer than) the casing 22 of FIG. 2A and may be adapted for use with standard surface mounts like the mount 10 of FIG. 1. These devices use an annular center body to support planar, vertically mounted filter media elements that are held in place by clamping members. The combined media retention assembly is configured to fit within the cylindrical casing while maximizing the challenge area of the filter media. The center body is typically formed as a prism-shaped body with a polygonal cross-section. This provides flat faces on one, some, or all of the sides through which flow windows are formed. The planar filtration media elements are positioned so as to span these windows. Frame-like clamping members are attached to the center body so as to hold the media elements in place.

FIGS. 1-12 illustrate an exemplary filtration apparatus 1000 according to an embodiment of the invention. While the filtration apparatus 1000 is illustrated in conjunction with the surface mount 10 of FIG. 1, it will be understood that it is usable with or may be adapted for use with other surface mount configurations. The filtration apparatus 1000 has a cylindrical casing 1050 with that has a closed upper end 1054 and an open base end that, upon installation of the apparatus 1000 on the surface mount 10, is sealed by the base 12 of the mount 10. The casing 1050 has an interior space 1052 and an inside diameter $C_D$.

Figure 8A:
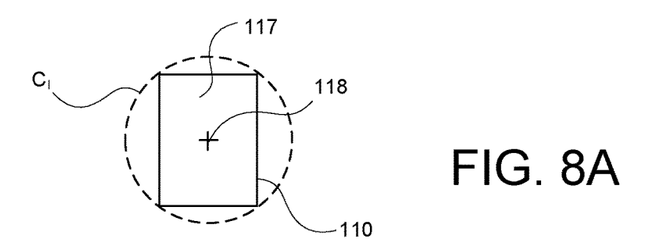
FIGS. 8A, 8B and 8C illustrate top, front and side views respectively of a filtration apparatus support body according to an embodiment of the invention.
Figure 8B:
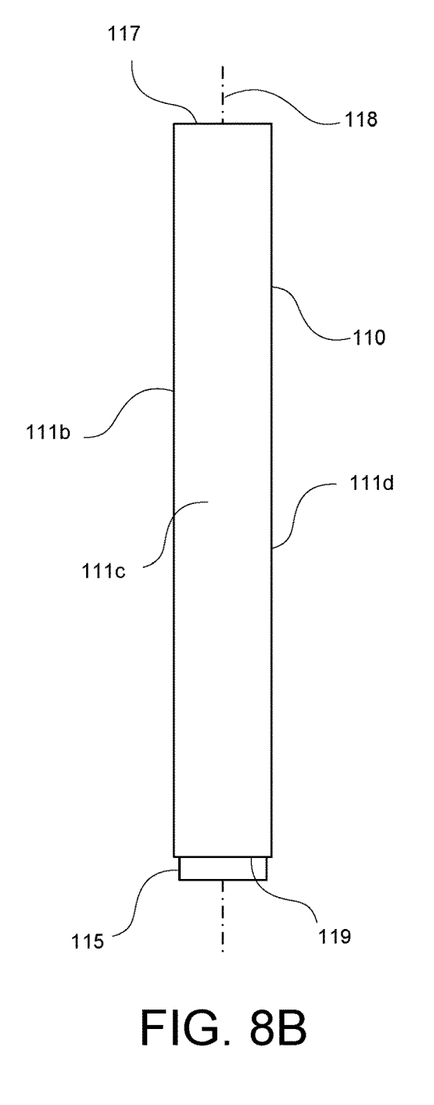
Figure 8C:
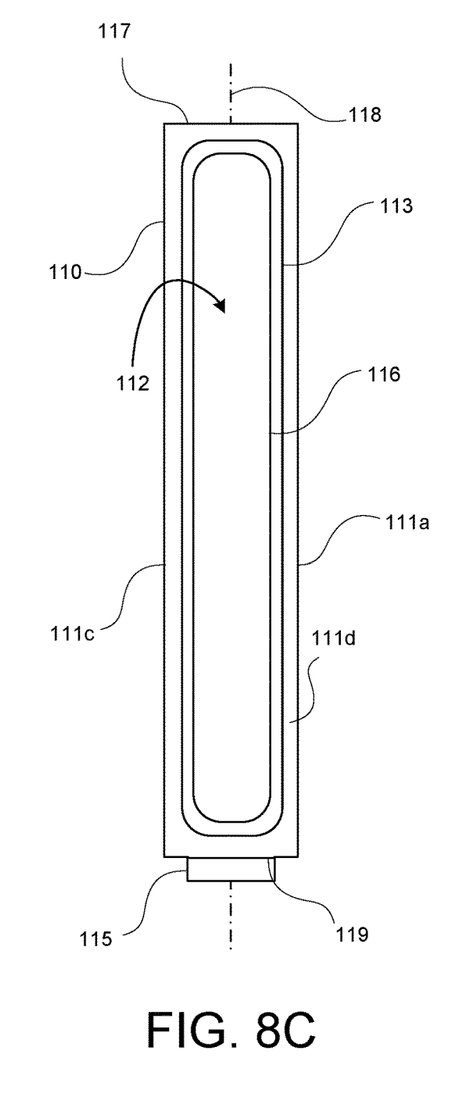
Figure 9:
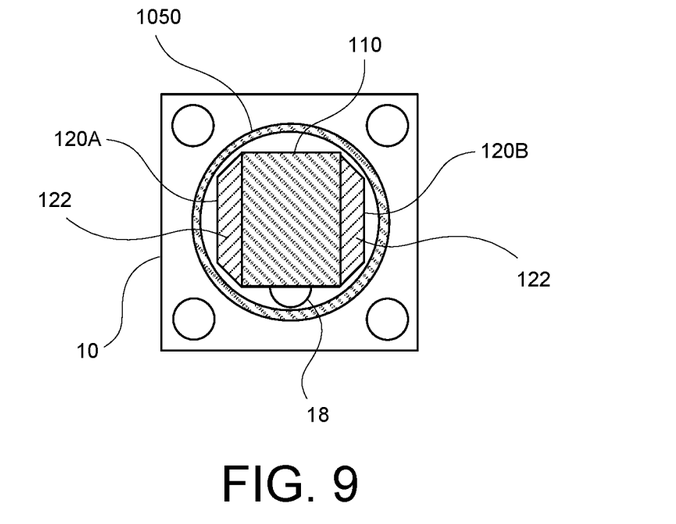
FIG. 9 is a lateral section view of the filtration apparatus of FIG. 3.
Figure 10:
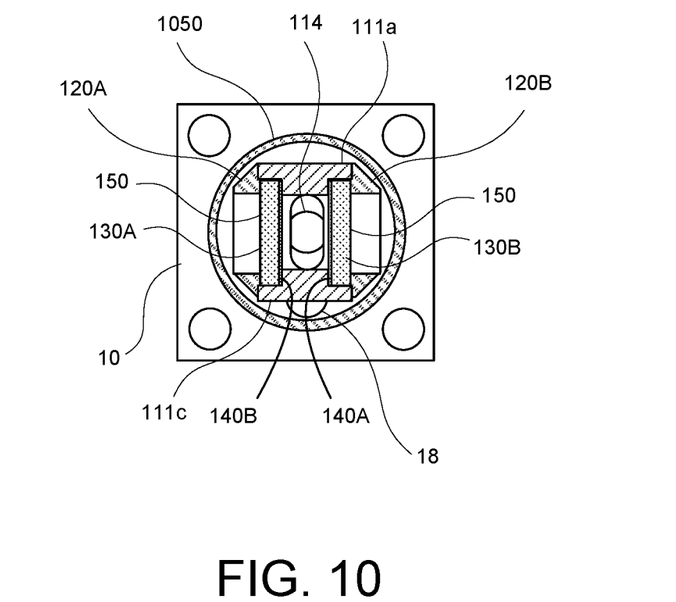
FIG. 10 is a lateral section view of the filtration apparatus of FIG. 3.
Figure 11:
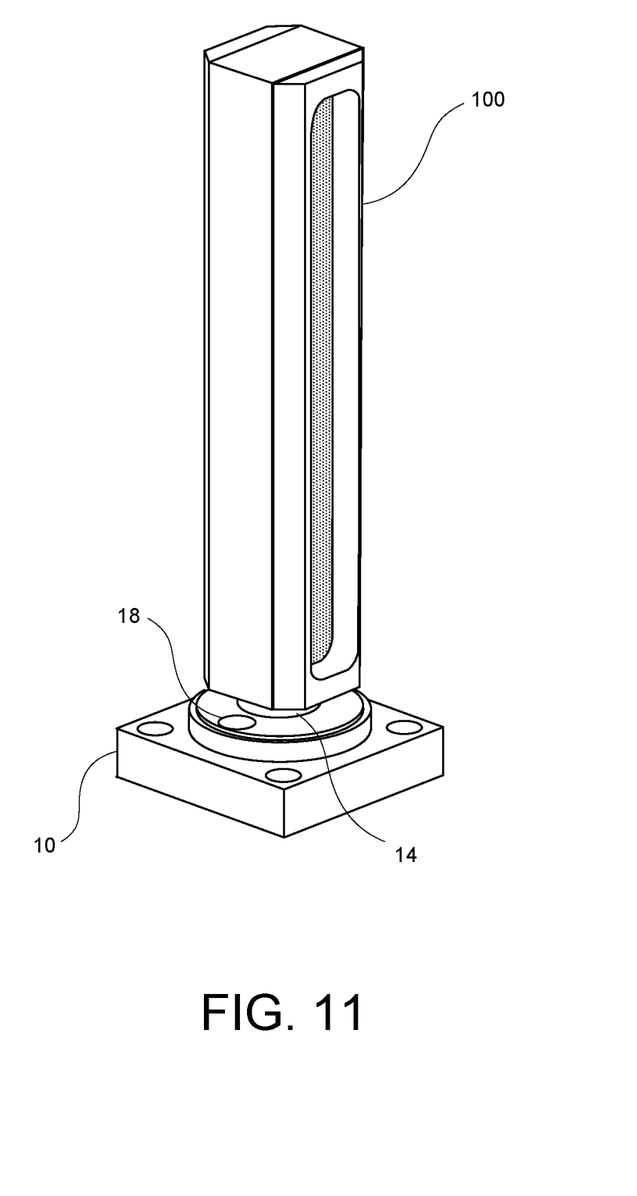
FIG. 11 is a perspective view of the filtration apparatus of FIG. 3 with the cylindrical cover removed.

The filtration apparatus 1000 may incorporate a filtration element assembly 100 according to a particular embodiment of the invention. The assembly 100 has a prismatic center support body 110 that has a constant, polygonal outside cross-section along its longitudinal axis 118. In the illustrated embodiment, the polygonal cross-section is rectangular, but other shapes may also be used. Regardless of the number of sides, the polygonal cross-section defines a circumscribed circle $C_I$ that is centered on the longitudinal axis 118 and has a diameter that is less than (or, in some embodiments, equal to) the inside diameter $C_D$ of the casing 1050. This allows the support body 110 to be received into the interior space 1052 of the casing 150. The support body 110 has top and bottom walls 117, 119 and a number of rectangular side walls 111 equaling the number of sides in the polygonal cross-section. The top, bottom and side walls 117, 119, 111 collectively define a support body interior space 112. The bottom wall 119 has a centerline-aligned support body exit port 114 formed there-through. An annular attachment flow fitting 115 may be attached to the bottom wall 119 at the exit port 114 to provide for aligned attachment of the support body 110 to the surface mount 10 and to provide for fluid communication between the support body exit port 114 and the surface mount exit port 16.

In the rectangular support body 110, two opposing sides 111b, 111d of the support body 110 have flow windows 116 formed there-through to provide communication between the interior space 112 and the exterior of the support body 110. The remaining two side walls 111a, 111c are closed. It will be understood that, while the illustrated embodiment has two walls 111 with flow windows 116, any number of side walls 111 may have a flow window 116. Each wall 111 having a flow window 116 also has a recessed receiving channel 113 surrounding the flow window 116. The receiving channel 113 is sized and configured to receive a filter medium structure 150 that fits within the recessed channel 113 so that the medium structure 150 spans across the flow window 116.

Figure 12:
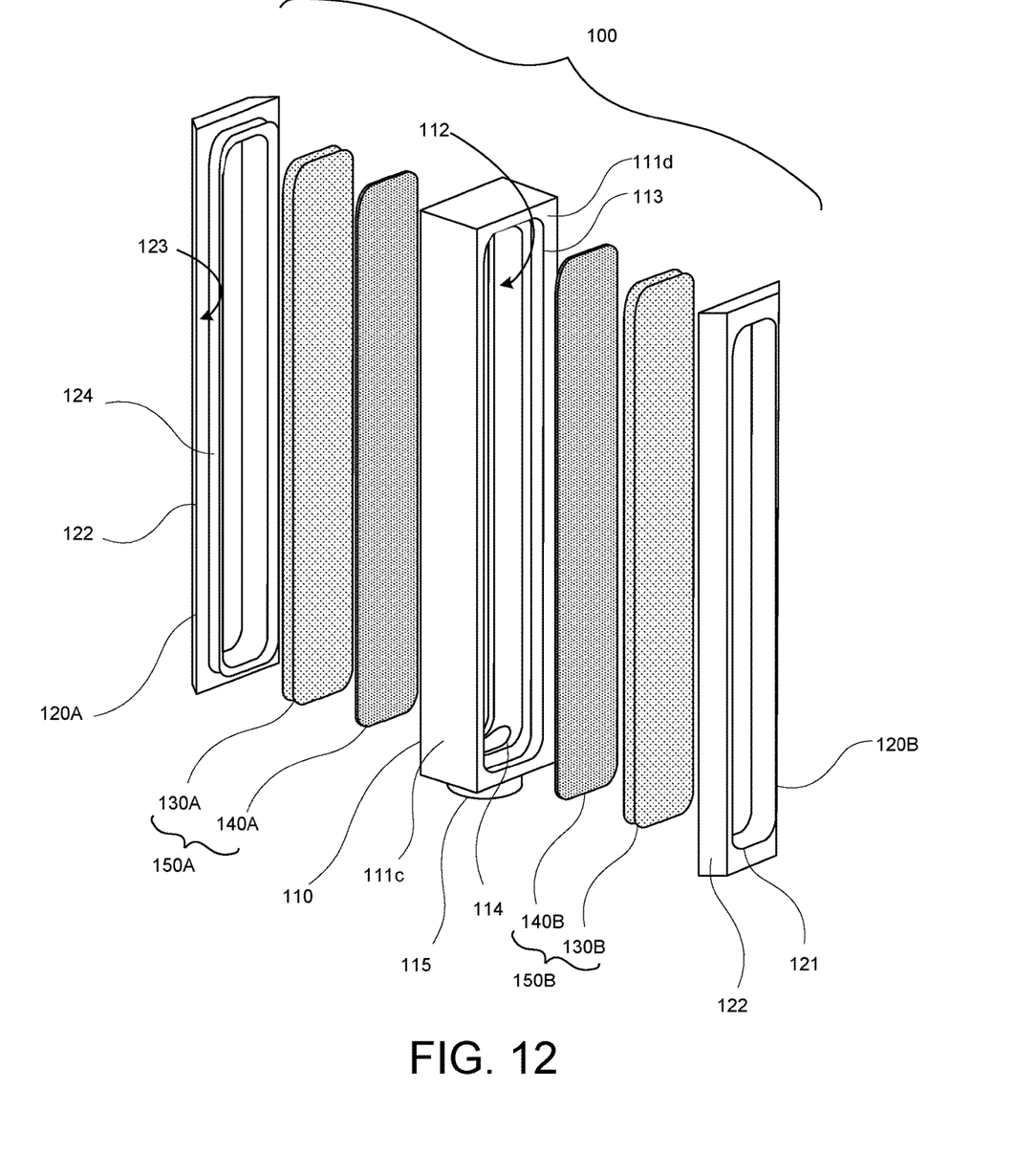
FIG. 12 is a exploded perspective view of a filtration element assembly according to an embodiment of the invention.

The filter medium structure 150 includes one or more filtration media elements. These media elements are each substantially self-sustaining planar members that are configured to screen particulate matter from gas flowing through the elements. The filter medium structure 150 may be configured to have desired flow-through, porosity, and filtration characteristics. In some embodiments, the filter medium structure 150 may consist of a single filtration medium layer. In other embodiments, the filter medium structure 150 may have multiple filtration medium layers. In the illustrated embodiment, each flow window 116 has an associated filtration element 150 that has an outer filter medium element 130A, 130B and an inner filter medium element 140A, 140B. The inner and outer filter medium elements 140, 130 may have different materials, structures, flow and/or filtration characteristics. In some embodiments, the inner and outer filter elements 140, 130 may be attached to one another to form a single filter element structure.

The individual filtration medium layers may be or include any substantially planar screening structure formed from materials suitable to the gas environment and the desired particle removal size. Particularly suitable filtration media are or include self-sustaining fiber structures, particularly those formed from metal fibers. As used herein, "self-sustaining" means that the fiber medium has sufficient structural integrity to withstand the pressure differential across the flow window 116 without additional reinforcement. The integrity of such structures can be established through a high level of entanglement and compression or through bonding (e.g., by sintering) of the fibers at spaced apart points of contact. In some embodiments, a metal fiber filtration medium may be constructed from a single highly convoluted and entangled fiber or from a plurality of entangled fibers. Typical metal fiber diameters may range from 1-100 µm. Suitable materials for the metal fibers used in the above-described filter media may include stainless and other steels as well as other alloys including, but not limited to nickel alloys and Hastelloy® alloys. The specific metal(s) can be selected based on, for example, expected temperature/environment and corrosion resistance. In some embodiments, the filtration media elements may be or include structures that are formed from sintered metal powder or a sintered combination of entangled metal fiber(s) and metal powder.

The filter medium structure 150, generally, and the filter medium elements, in particular, can be tailored to provide desired filtration characteristics. In typical applications, the filter medium structure can be configured to remove particles having an effective diameter greater than 1.000 micron. In particular applications the filter medium structure 150 can be configured to remove particles having an effective diameter greater than 0.100 µm. As noted above, the inner and outer filter medium elements 140, 130 may have varying characteristics. In some cases, the outer filter medium element 130 may be configured to screen only particles having a relatively high diameter, while the inner filter medium element 140 may be configured to screen smaller particles. In a particular example, the outer filter medium element 130 could have a porosity in a range of 50-80 percent (more particularly, 60-70 percent) and the inner filter medium element 140 could have a porosity in a range of 30-60 percent (more particularly, 40-50 percent. This form of staged filtration can serve to prevent clogging and consequent increased pressure loss through the life of the filtration apparatus 100. Any number of media elements can be used to provide the desired filtration gradient. Alternatively, a single media element having a variable porosity gradient may be used. By staging filtration media, efficient filtration of particles down to 0.003 µm can be achieved without producing undesirable pressure losses or reducing the life of the device.

The filter medium structure 150 is sized so that it completely covers the flow window 116 and fits into the recessed receiving channel 113 surrounding the flow window 116. The initial thickness of the filter medium structure 150 may be greater than the depth of the receiving channel 113 so that subsequent placement of the filter retention clamping member results in compression of the portion of the filter medium structure 150 surrounding the flow window 116.

As best seen in FIG. 12, the filtration element assembly 100 has two clamping members 120A, 120B that serve to hold the filter medium structures 150A, 150B in place within the receiving channels 113 of the support body 110. It will be understood that embodiments having additional flow windows and filter medium structures will also have corresponding clamping members. Each clamping member 120 has a frame portion 122 having a flat, inward facing surface 123 that engages a support body side wall 111a or 111c. A flange portion 124 extends inwardly from the flat surface 123. A clamp member window 121 extends through the frame portion 122 and the flange portion 124. When the filtration assembly 100 is assembled, the clamp member windows 121 are in registration with the flow windows 116 of the support body 110. The perimeter of the flange portion 124 is sized and shaped to correspond to the shape of the receiving channel 113 for reception therein. The frame portion 122 is configured so that the perimeter dimensions of the flat surface 123 matches those of the side walls 111a, 111c. The longitudinal cross-section of the flange portion 124 (best seen in FIG. 9) is configured so that the combined support body 110 and clamping members 120A, 120B fit within the cylindrical casing 1050. In particular embodiments, the flange portion 124 may be configured so that the combined support body 110 and clamping members 120A, 120B collectively form a polygonal cross-sectional shape that defines a circumscribed circle, which may be the same circle $C_I$ defined by the cross-section of the support body 110 alone. In such embodiments, the cross-section of the flange portion 124 may be a trapezoid as in the illustrated embodiment. In other embodiments, the outer portion of the frame portion 122 may be curved to fit within the casing 1050.

When the filtration element assembly 100 is assembled, the filter medium structures 150A, 150B are disposed or partially disposed within the receiving channels 113. The clamping members 120A, 120B are then mated to the support body 110. In accomplishing this, the flange portions 124 are inserted into the receiving channels 113 to engage and compress the filter medium structures 150A, 150B. When the flange portions 124 are fully inserted, the flat surface 123 of the clamping member 120A engages the surface of side wall 111b and the flat surface 123 of the clamping member 120B engages the surface of side wall 111d. The clamping members 120 may be attached to the support body 110 in this configuration by any suitable means such as welding or bonding.

The support body 110 and the clamping members 120 may be formed from any materials that provide sufficient rigid support for the filter element structures 150 and that will retain structural integrity under expected environmental conditions. Such materials may include, but are not limited to stainless and other steels as well as other alloys including, but not limited to nickel alloys and Hastelloy® alloys.

Figure 5:
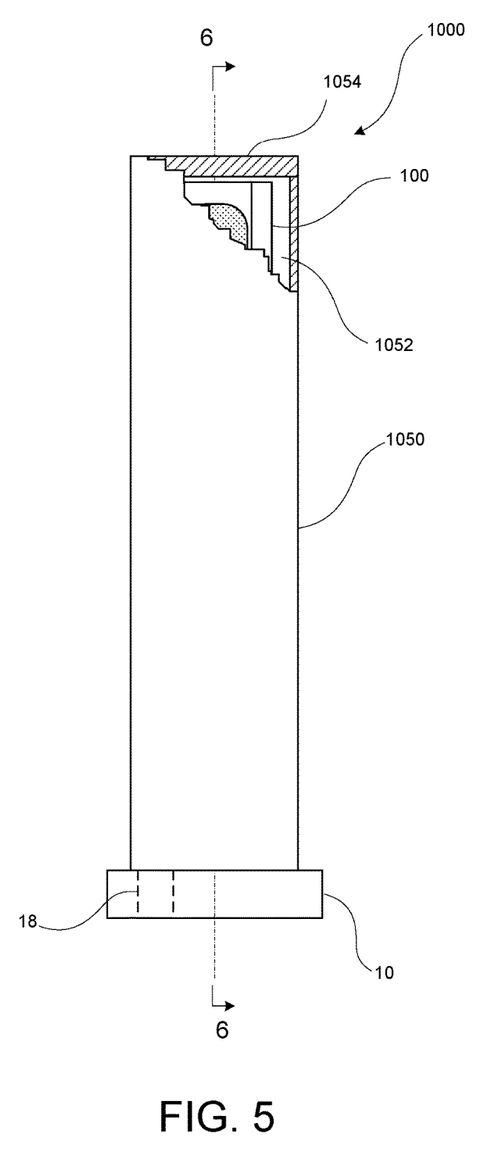
FIG. 5 is a side view of the filtration apparatus of FIG. 3.
Figure 6:
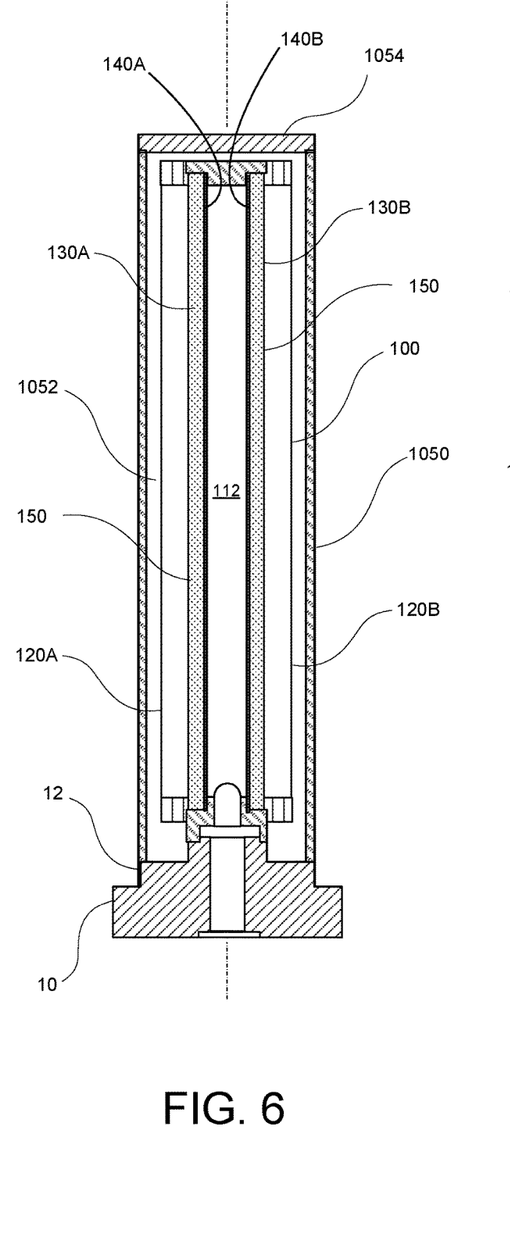
FIG. 6 is a longitudinal section view of the filtration apparatus of FIG. 3.
Figure 7:
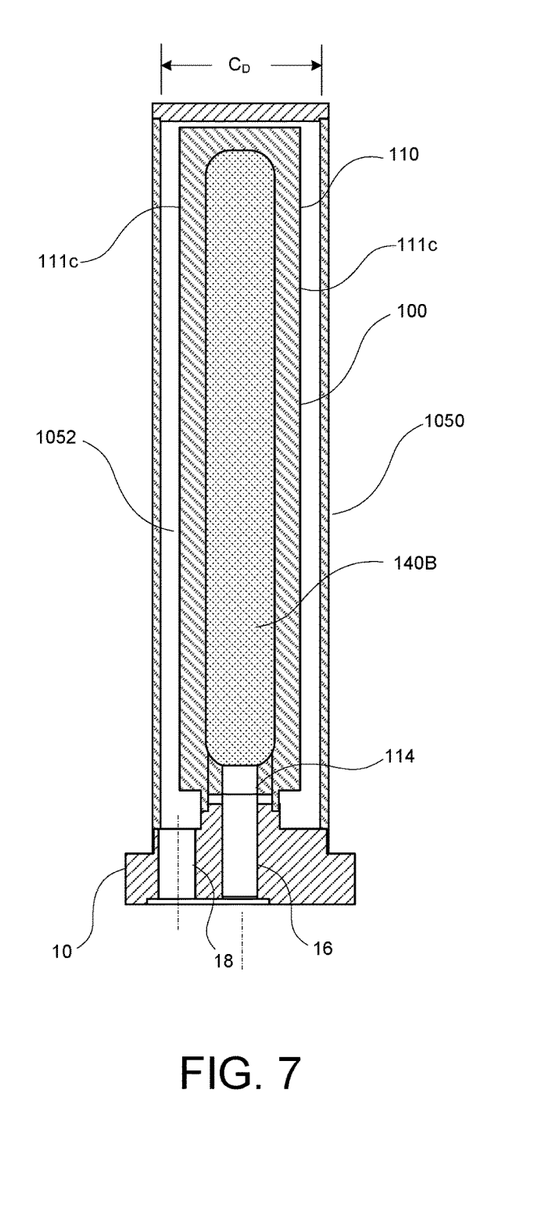
FIG. 7 is a longitudinal section view of the filtration apparatus of FIG. 3.

The filtration element assembly 100 may be received into the cylindrical casing 1050 and the two mounted to the surface mount 10 as shown in FIGS. 5-7. In this configuration, particle laden gas may be introduced through the surface mount port 18 into the casing interior space 1052 surrounding the filtration element assembly 100. The particle laden gas is then drawn through the filter element structures 150A, 150B into the support body interior 112, thereby producing filtered gas, which then passes out through the support body exit port 114 and the surface mount port 16.

It will be understood that in some embodiments, the upstream and downstream flow directions may be reversed. In such embodiments, the in-flow of gas would be through the port 16 and the out-flow through port 18. This would put the challenge side of the filter medium structure 150 inside the support structure interior 112 with the gas flow outward through the filter media.

Figure 13:
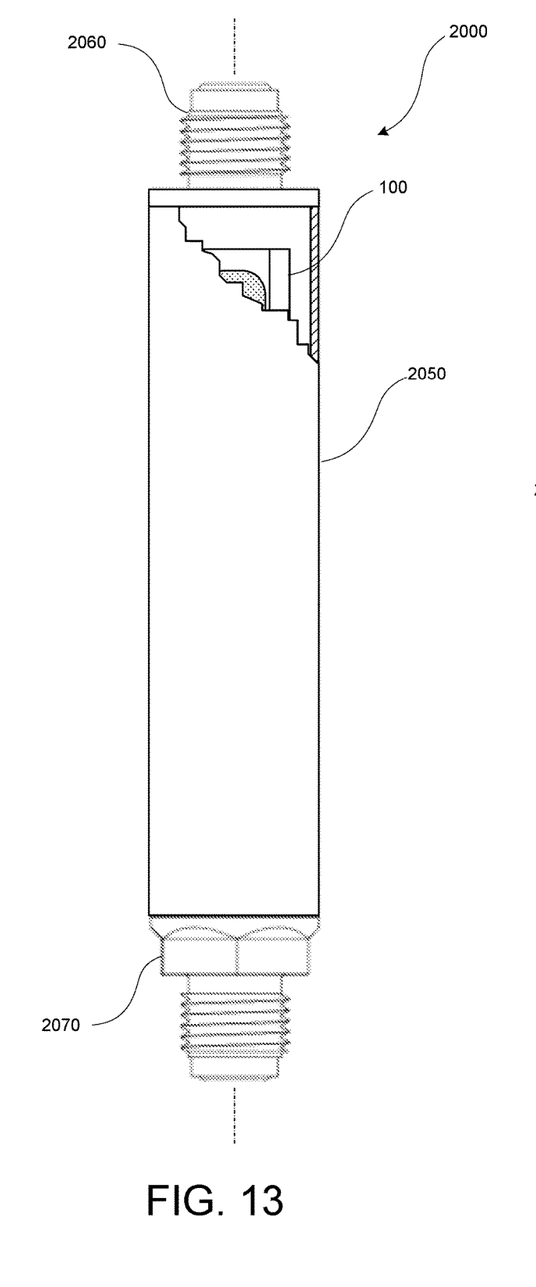
FIG. 13 is a front view of a filtration apparatus according to an embodiment of the invention.
Figure 14:
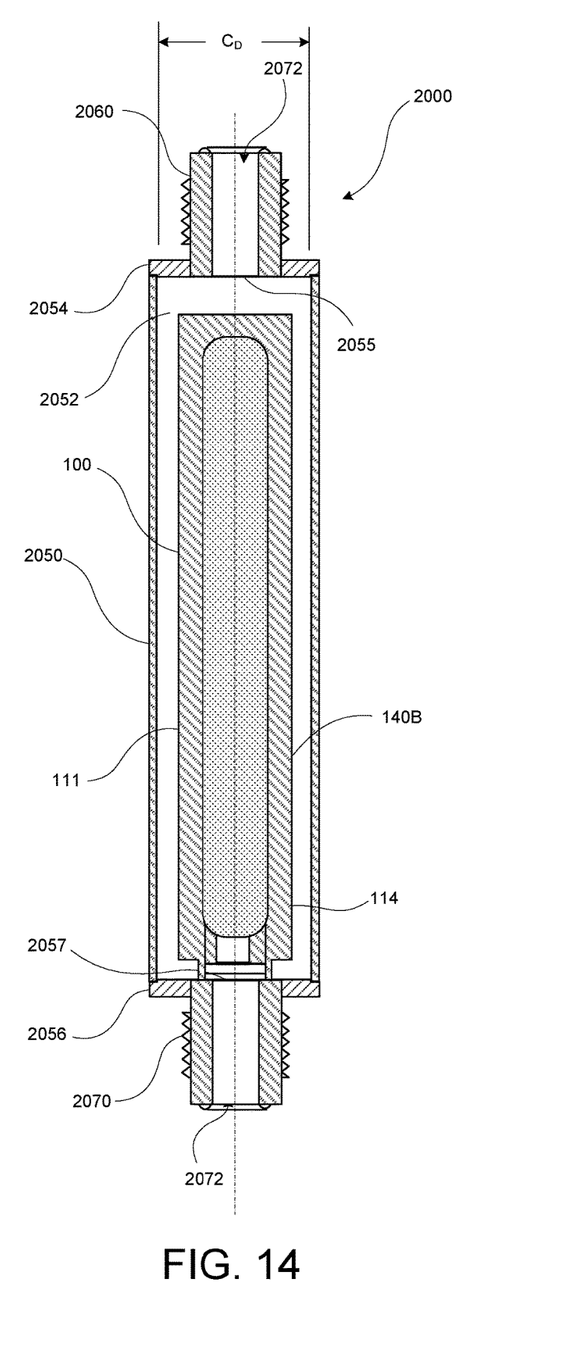
FIG. 14 is a longitudinal section view of the filtration apparatus of FIG. 13.

The filtration element assembly 100 may also be used in "in-line" applications gas flow line applications. With reference to FIGS. 13 and 14, a filtration apparatus 2000 has a cylindrical casing 2050 with an upper end 2054 having an inlet port 2055 and a lower end 2056 having an outlet port 2057. An inlet fitting 2060 having an inlet flow channel 2062 is attached to the upper end 2054 and an outlet fitting 2070 having an outlet flow channel 2072 is attached to the lower end. The fittings 2060, 2070 are configured for connection to gas flow lines and to provide fluid communication from such lines into and through the filtration apparatus 2000. The casing 2050 has an interior space 2052 and an inside diameter $C_D$.

While the attachment fitting 115 may be adapted for use in the in-line configuration, the filtration element assembly 100 is substantially unchanged from the configuration described above for use with a surface mount. As before, the filtration element assembly 100 may be sized to maximize filtration flow area within the limits of the diameter of the surrounding casing 2050. If length is not a limiting factor, the casing 2050 and the filtration element assembly may be lengthened to increase filtration area and efficiency. In the in-line configuration, particle-laden gas is brought into the casing interior 2052 through the inlet fitting 2070 from an upstream gas line. The particle laden gas passes through the filter element structures 150A, 150B into the support body interior 112, thereby producing filtered gas, which then passes out through the exit fitting 2070 to a downstream gas line.

It will be understood that in some embodiments the flow direction of particle laden gas may be in the reverse direction so that the port 2057 through the lower end 2056 operates as an inlet and the port 2055 through the upper end 2054 operates as an exit.

The filtration apparatus of the present invention provide significant performance advantages over prior art 'sintered powder media' apparatus. Exemplary test results have shown that filtration apparatus of the invention having the same challenge surface area as a comparable cylindrical sintered metal apparatus may provide lower pressure loss across the filtration media, higher flow rates, and longer life within the same cross-sectional footprint. These performance advantages may be further enhanced through the use of staged media layers. The planar filtration media used in the apparatus of the invention are also less expensive to manufacture and allow a high degree of flexibility in producing desired filtration efficiencies. The filtration apparatus of the invention are not limited to any particular size, flow rate, or environment.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A filtration element assembly for use in conjunction with a cylindrical filter casing having a casing diameter, the filtration element assembly comprising:
    a prismatic support body having top and bottom base walls and a plurality of rectangular side walls connecting the top and bottom base walls, the top, bottom and side walls defining a support body interior space and the side walls collectively forming a polygonal outer cross-sectional shape defining a circumscribed circle having a circumscribed circle diameter less than or equal to the casing diameter, the base wall having an outlet flow passage formed there-through, and at least one of the side walls having an inlet flow passage formed-there-through with a filtration element receiving channel surrounding the inlet flow passage;
    a porous filtration structure disposed within the filtration element receiving channel of each of the at least one of the side walls so as to cover the inlet flow passage, the filtration structure being configured for removing particulate matter from a gas flow passing there-through; and
    a clamping member attached to each of the at least one side wall, each clamping member having a framing portion and a flange portion, the framing portion extending along a full length and a full width of said at least one side wall and having a flow window formed there-through in registration with the inlet flow passage, and the flange portion extending from the framing portion and being sized and configured for reception into the receiving channel to engage and retain the filtration element within the receiving channel.

2. A filtration element assembly according to claim 1 wherein the support body and the clamping member or clamping members collectively form a second polygonal outer cross-sectional shape defining a second circumscribed circle having the circumscribed circle diameter.

3. A filtration element assembly according to claim 2 wherein each clamping member has a trapezoidal cross-section.

4. A filtration element assembly according to claim 1 wherein the porous filtration structure comprises at least one planar filtration element.

5. A filtration element assembly according to claim 4 wherein at least one of the at least one planar filtration element comprises an entangled metal fiber filter medium.

6. A filtration element assembly according to claim 4 wherein the porous filtration structure comprises a first planar filtration element having a first set of flow and filtration characteristics and a second planar filtration element having a second set of flow and filtration characteristics.

7. A filtration element assembly according to claim 1 wherein:
    the at least one of the side walls consists of a first side wall and an opposing second side wall on an opposite side of the support body from the first side wall, the first side wall having a first inlet flow passage formed-there-through and a first filtration element receiving channel surrounding the first inlet flow passage and the second side wall having a second inlet flow passage formed-there-through and a second filtration element receiving channel surrounding the second inlet flow passage, the second inlet passage being in registration with the first inlet passage.

8. A filtration element assembly according to claim 7 comprising:
    a first porous filtration structure at least partially disposed within the first filtration element receiving channel and comprising a first at least one planar filtration element; and
    a second porous filtration structure at least partially disposed within the second filtration element receiving channel and comprising a second at least one planar filtration element,
    wherein the second at least one planar filtration element is parallel to the first at least one planar filtration element.

9. A filtration element assembly according to claim 7 wherein the polygonal outer cross-sectional shape of the support body is a rectangle.

10. A filtration apparatus comprising:
a cylindrical casing having a longitudinal casing centerline, a cylindrical wall having an inside diameter, and first and second end caps, the cylindrical wall and first and second end caps defining a casing interior space, the casing having a first flow port formed through the first cap along the casing centerline and a second flow port formed through one of the first and second end caps;
a prismatic support body disposed within the cylindrical casing along the longitudinal casing centerline, the support body having top and bottom base walls and a plurality of side walls connecting the top and bottom base walls, the top, bottom and side walls defining a support body interior space, the base wall having an outlet flow passage formed there-through, at least one of the side walls having an inlet flow passage formed-there-through and a filtration element receiving channel surrounding the inlet flow passage, and the support body being secured to the first end cap so that the outlet flow passage is in registration and fluid communication with the first flow passage;
a porous filtration structure disposed within the filtration element receiving channel of each of the at least one of the side walls so as to cover the inlet flow passage, the filtration structure being configured for removing particulate matter from a gas flow passing there-through; and
a clamping member attached to each of the at least one side wall, each clamping member having a framing portion and a flange portion, the framing portion extending along a full length and a full width of said at least one side wall and having a flow window formed there-through in registration with the inlet flow passage, and the flange portion extending from the framing portion and being sized and configured for reception into the receiving channel to engage and retain the filtration element within the receiving channel.

11. A filtration apparatus according to claim 10 wherein the support body and the clamping member or clamping members collectively form a polygonal outer cross-sectional shape that is constant from the top base wall to the bottom base wall and that defines a circumscribed circle having a circumscribed circle diameter that is less than or equal to the casing diameter.

12. A filtration apparatus according to claim 10 wherein the porous filtration structure comprises at least one planar filtration element.

13. A filtration apparatus according to claim 12 wherein at least one of the at least one planar filtration element comprises an entangled metal fiber filter medium.

14. A filtration apparatus according to claim 4 wherein the porous filtration structure comprises a first planar filtration element having a first set of flow and filtration characteristics and a second planar filtration element having a second set of flow and filtration characteristics.

15. A filtration apparatus according to claim 10 wherein:
the at least one of the side walls consists of a first side wall and an opposing second side wall on an opposite side of the support body from the first side wall, the first side wall having a first inlet flow passage formed-there-through and a first filtration element receiving channel surrounding the first inlet flow passage and the second side wall having a second inlet flow passage formed-there-through and a second filtration element receiving channel surrounding the second inlet flow passage, the second inlet passage being in registration with the first inlet passage.

16. A filtration apparatus according to claim 15 comprising:
a first porous filtration structure at least partially disposed within the first filtration element receiving channel and comprising a first at least one planar filtration element; and
a second porous filtration structure at least partially disposed within the second filtration element receiving channel and comprising a second at least one planar filtration element,
wherein the second at least one planar filtration element is parallel to the first at least one planar filtration element.

17. A filtration apparatus according to claim 16 wherein the prismatic support body has a rectangular outer cross-sectional shape.

18. A filtration apparatus according to claim 10 further comprising:
an outlet fitting attached to the first endcap and having an outlet passage in registration with the first flow port.

19. A filtration apparatus according to claim 10 wherein the second flow port is formed through the second end cap along the casing centerline, and the filtration apparatus further comprises:
an inlet fitting attached to the second endcap and having an inlet passage in registration with the second flow port.

20. A filtration apparatus according to claim 19 wherein the inlet fitting is configured for attachment to and fluid communication with an upstream gas line and the outlet fitting is configured for attachment to and fluid communication with a downstream gas line.

* * * * *